(12) United States Patent
Sato

(10) Patent No.: US 6,813,101 B2
(45) Date of Patent: Nov. 2, 2004

(54) IMAGING LENS

(75) Inventor: Kenichi Sato, Ageo (JP)

(73) Assignee: Fuji Photo Opitcal Co., Ltd., Saitama (JP)

(*) Notice: Subject to any disclaimer, the term of this patent is extended or adjusted under 35 U.S.C. 154(b) by 0 days.

(21) Appl. No.: 10/614,805

(22) Filed: Jul. 9, 2003

(65) Prior Publication Data
US 2004/0057125 A1 Mar. 25, 2004

(30) Foreign Application Priority Data
Sep. 19, 2002 (JP) .................................. 2002-273084

(51) Int. Cl.$^7$ ............................ G02B 9/06; G02B 9/04; G02B 13/18
(52) U.S. Cl. ................ 359/794; 359/793; 359/717
(58) Field of Search .............................. 359/794, 793, 359/717

(56) References Cited

U.S. PATENT DOCUMENTS
5,739,965 A  4/1998  Ohno

FOREIGN PATENT DOCUMENTS
JP   H1-245211   9/1989
JP   2000-258684  9/2000

Primary Examiner—David N. Spector
(74) Attorney, Agent, or Firm—Arnold International; Jon W. Henry; Bruce Y. Arnold

(57) ABSTRACT

An imaging lens of fixed focal length is formed of, in order from the object side, an aperture diaphragm, a first lens component having positive refractive power and having at least one aspheric lens surface, and a second lens component having positive refractive power and having at least one aspheric lens surface. The imaging lens satisfies two specified conditions so as to favorably correct distortion and curvature of field while providing a sufficient distance from the imaging lens to the exit pupil of the imaging lens. In addition, one or more of the lens components may each be formed of a single lens element.

7 Claims, 2 Drawing Sheets

Spherical Aberration

Astigmatism

Distortion

Spherical Aberration

Astigmatism

Distortion

IMAGING LENS

BACKGROUND OF THE INVENTION

Recently, digital cameras have become very popular, along with personal computers that process image information from imaging systems. More compact and less expensive digital cameras and imaging systems are being demanded, and these demands have been addressed by developing more compact and less expensive imaging lenses. For example, Japanese Laid-Open Patent Application 2000-258684 discloses an imaging lens that includes, in order from the object side, a negative lens element and a positive lens component with a sufficient back focus distance, with a short focal length, and with at least one lens surface of the negative lens element being an aspheric lens surface. However, the imaging lens of this published Japanese application is not sufficiently compact. Greater compactness, as well as a more inexpensive imaging lens, is needed.

Previously in digital cameras, it has been necessary to use small optical elements that allow a principal ray to enter at an angle of incidence within about fifteen degrees to the normal of the imaging plane because of the light detecting properties of the image pickup elements used with the imaging lens. Recently however, the use of principal rays with angles of incidence larger than about fifteen degrees have become acceptable with some image pickup elements now available. Accordingly, the development of an imaging lens that is capable of correcting aberrations with the principal ray having a larger angle of incidence is desired.

BRIEF SUMMARY OF THE INVENTION

The present invention relates to a fixed focus imaging lens that is compact, is of inexpensive construction, favorably corrects aberrations, and is particularly designed for use in digital cameras and imaging systems used with personal computers and portable electronic equipment.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

First, definitions of the terms "lens element" and "lens component" that relate to the following detailed description will be given. The term "lens element" is herein defined as a single transparent mass of refractive material having two opposed refracting surfaces, which surfaces are positioned at least generally transversely of the optical axis of the imaging lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

Figure 1:
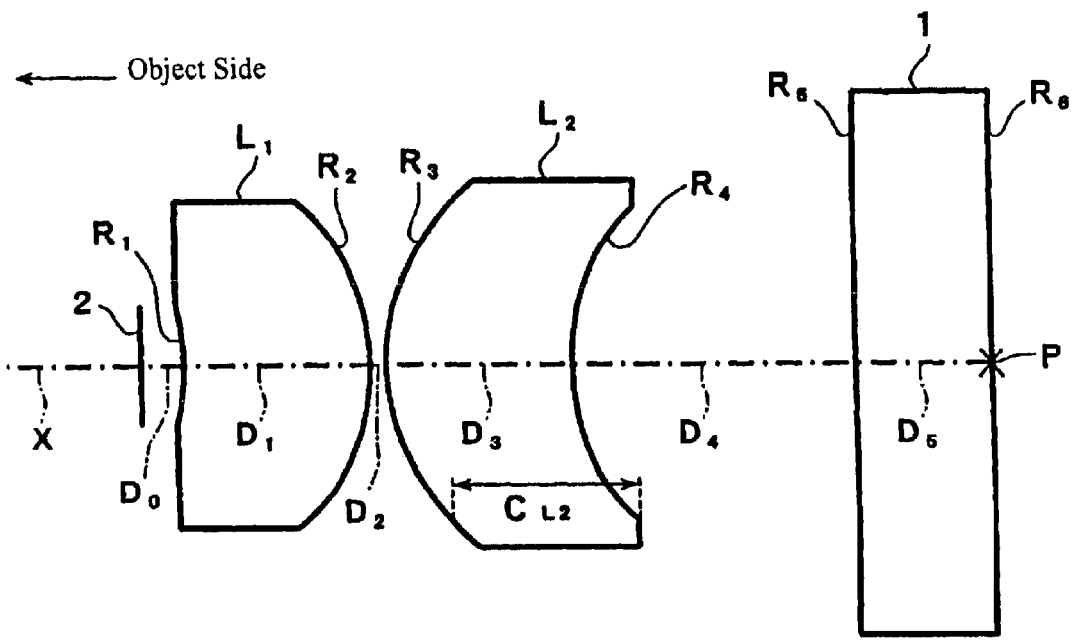
FIG. 1 shows a cross-sectional view of the imaging lens according to Embodiment 1.

A general description of the preferred embodiments of the imaging lens of the present invention will now be described with reference to FIG. 1 that shows Embodiment 1. In FIG. 1, the lens elements are referenced by the symbols $L_1$ and $L_2$, in order from the object side of the imaging lens. Similarly, the radii of curvature of the refractive optical elements are referenced by the letter R followed by a subscript denoting their order from the object side of the imaging lens, from $R_1$ to $R_6$. The on-axis surface spacings (along the optical axis X of the figures) of all the optical surfaces are referenced by the letter D with a subscript denoting their order from the object side of the imaging lens, from $D_0$ to $D_5$.

In accordance with the definitions of "lens component," and "lens element" above, in the two preferred embodiments of the imaging lens of the present invention described below, lens elements $L_1$ and $L_2$ are also lens components. Thus, the present invention may variously be described in terms of lens elements or in terms of lens components. For simplicity of explanation, the following descriptions of the present invention refer generally to lens elements. However, these descriptions apply more generally also to lens components for which the lens elements are examples. Additionally, when the lens components may include more than one lens element, lens elements, as well as the lens components, may satisfy the following descriptions, as appropriate.

As shown in FIG. 1, an aperture diaphragm 2 that operates as an aperture stop is arranged on the object side of the first lens element $L_1$. That is, the aperture diaphragm 2 is arranged nearer the object side within the imaging lens. A collimated beam that is parallel to the optical axis X is converged to the position P, and a cover glass 1 is positioned on the image side of the second lens element $L_2$ with one surface thereof including the position P. Entrance surfaces of image pickup elements (not shown) may be located at the surface which includes the position P.

The first lens element $L_1$ has positive refractive power and a meniscus shape with its concave lens surface on the object side, and the second lens element $L_2$ has positive refractive power and a meniscus shape with its convex lens surface on the object side. The curvature of field of the image surface can be favorably corrected by making the first lens element $L_1$ of a meniscus shape with its concave lens surface on its object side and the second lens $L_2$ of a meniscus shape with its convex lens surface on the object side. Additionally, aberrations can be corrected extremely well by making both lens surfaces of both the first lens element $L_1$ and the second lens element $L_2$ of aspheric shape. Even if only one lens surface of each of the first lens element $L_1$ and the second lens element $L_2$ is of aspheric shape, aberrations can be corrected relatively well.

Additionally, the concave lens surface of the second lens element having a meniscus shape is formed so that its negative refractive power increases as the distance Y from the optical axis X increases, which assists in correcting the curvature of field of the image surface.

For lens surfaces that are aspheric, the lens surfaces are described by the following equation:

$$Z=[(CY^2)/\{1+(1-K\cdot C^2\cdot Y^2)^{1/2}\}]+A_3Y^3+A_4Y^4+A_5Y^5+A_6Y^6+A_7Y^7+A_8Y^8+A_9Y^9+A_{10}Y^{10} \quad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R) of the aspheric lens surface near the optical axis, Y is the distance (in mm) from the optical axis, K is the eccentricity, and $A_3$–$A_{10}$ are the third through tenth aspheric coefficients.

Further, preferably the following condition is satisfied:

$$f1/f2<3.0 \quad \text{Condition (1)}$$

where f1 is the focal length of the first lens element $L_1$, and f2 is the focal length of the second lens element $L_2$.

If Condition (1) is not satisfied, it becomes difficult to correct the curvature of field of the image surface.

Additionally, preferably the following condition is satisfied:

$$C_{L2}/D_{L2}>0.8 \quad \text{Condition (2)}$$

where $C_{L2}$ is the thickness of said second lens component, measured parallel to the optical axis, at a distance from the optical axis determined by the smaller maximum optically effective diameter in said imaging lens of the two lens surfaces of said second lens component, and $D_{L2}$ is the thickness of the second lens component at the optical axis X.

Figure 2:
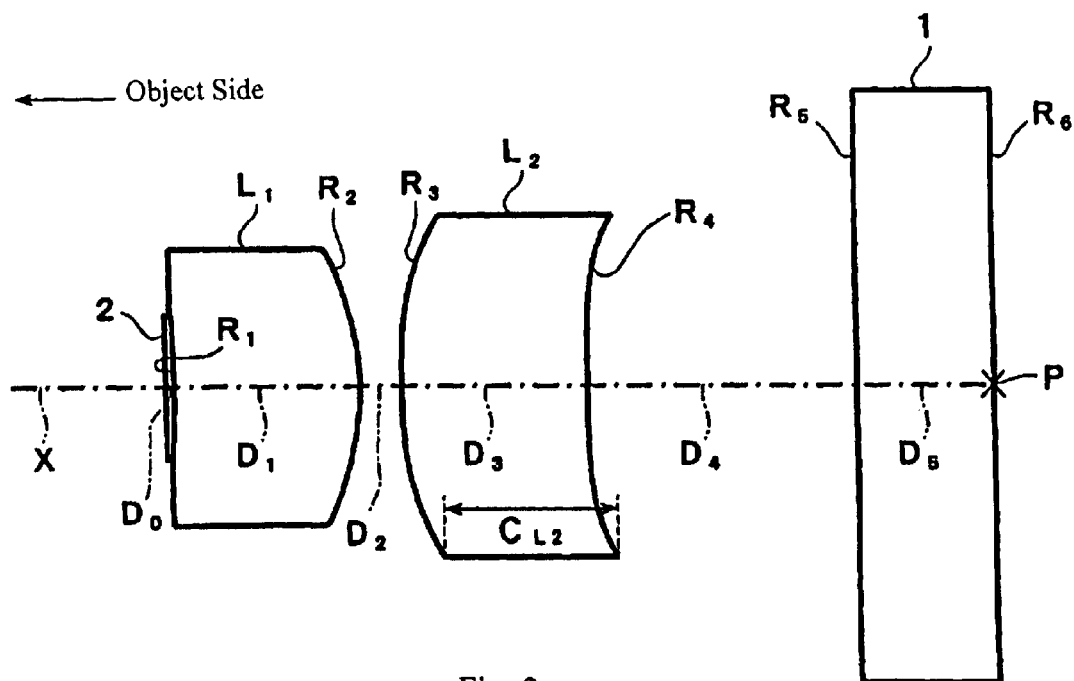
FIG. 2 shows a cross-sectional view of the imaging lens according to Embodiment 2.

As shown in FIGS. 1 and 2, $C_{L2}$ is a distance, as measured parallel to the optical axis, from a point at the periphery of the optically effective area of the lens surface of the second lens element $L_2$ that has the smaller maximum optically effective diameter in said imaging lens to the other lens surface of the second lens element $L_2$.

Condition (2) above controls the shape of the second lens element. If Condition (2) is not satisfied, it becomes difficult to correct distortion and curvature of field while providing a sufficient distance to the exit pupil.

Two preferred embodiments of the imaging lens of the present invention will now be described with reference to FIGS. 1 and 2.

Embodiment 1

FIG. 1 shows a cross-sectional view of the basic lens element configuration of the imaging lens of Embodiment 1. Table 1 below lists the surface number #, in order from the object side, the radius of curvature R (in mm) of each surface near the optical axis, the on-axis surface spacing D (in mm), as well as the refractive index $N_d$ and the Abbe number $\nu_d$ (both at the d-line of λ=587.6 nm) of each optical element for Embodiment 1. Listed in the bottom portion of Table 1 are the focal length f, the f-number $F_{NO}$, and the maximum image angle 2ω.

TABLE 1

| # | R | D | $N_d$ | $\nu_d$ |
|---|---|---|---|---|
| 0 (stop) | ∞ | 0.25 | | |
| 1* | −1.4813 | 1.10 | 1.50614 | 56.4 |
| 2* | −1.3948 | 0.10 | | |
| 3* | 1.2881 | 1.10 | 1.50614 | 56.4 |
| 4* | 1.7046 | 1.67 | | |
| 5 | ∞ | 0.80 | 1.51680 | 64.2 |
| 6 | ∞ | | | |
| f = 2.75 mm | | $F_{NO}$ = 4.0 | 2ω = 63.8° | |

The surfaces with a * to the right of the surface number in Table 1 are aspheric lens surfaces, and the aspheric surface shape is expressed by Equation (A) above.

Table 2 below lists the values of the constants K, $A_4$, $A_6$, $A_8$, and $A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E−2" represents the number $1.0\times10^{-2}$.

TABLE 2

| # | K | $A_4$ | $A_6$ | $A_8$ | $A_{10}$ |
|---|---|---|---|---|---|
| 1 | −8.3450 | −3.1124E-1 | −1.1619E-1 | 6.0955E-2 | 2.0131E-2 |
| 2 | 1.0557 | −7.0484E-4 | −9.7380E-3 | −2.6776E-2 | −7.5055E-3 |
| 3 | 2.9314E-1 | 2.7421E-2 | −2.0416E-2 | 2.0119E-2 | −5.3439E-3 |
| 4 | 1.5493E-1 | 1.2355E-1 | 1.5674E-2 | 1.2923E-2 | 3.3139E-3 |

Embodiment 1 satisfies Condition (1) with the value of f1/f2 being equal to 1.62. Embodiment 1 also satisfies Condition (2) with the value of $C_{L2}/D_{L2}$ being equal to 0.99. FIG. 1 illustrates the distance $C_{L2}$, and the distance $D_{L2}$ is the distance illustrated in FIG. 1 as $D_3$.

Figure 3A:
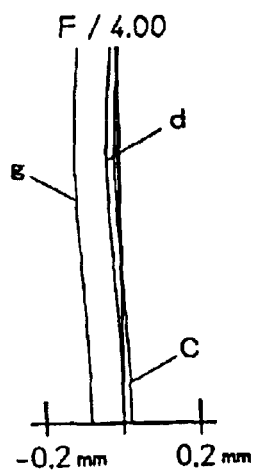
FIGS. 3A–3C show the spherical aberration, astigmatism, and distortion, respectively, according to Embodiment 1.
Figure 3B:
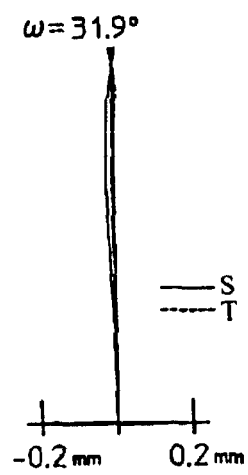
Figure 3C:
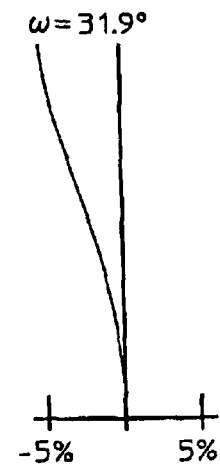

FIGS. 3A–3C show the spherical aberration, astigmatism, and distortion, respectively, of the imaging lens according to Embodiment 1. In FIG. 3A, the spherical aberration is shown for the d-line (λ=587.6 nm), the g-line (λ=435.8 nm), and the C-line (λ=656.3 nm). As shown in FIG. 3A, the f-number is 4.00. In FIG. 3B, the astigmatism is shown at the d-line (λ=587.6 nm) for both the sagittal image surface S and the tangential image surface T. In FIG. 3C, the distortion is shown at the d-line (λ=587.6 nm). The half-image angle ω for FIGS. 3B and 3C is 31.9°.

As is clear from the lens data and aberration curves discussed above, in Embodiment 1 the various aberrations are favorably corrected.

Embodiment 2

FIG. 2 shows a cross-sectional view of the basic lens element configuration of the imaging lens of Embodiment 2. Table 3 below lists the surface number #, in order from the object side, the radius of curvature R (in mm) of each surface near the optical axis, the on-axis surface spacing D (in mm), as well as the refractive index $N_d$ and the Abbe number $\nu_d$ (both at the d-line of λ=587.6 nm) of each optical element for Embodiment 2. Listed in the bottom portion of Table 3 are the focal length f, the f-number $F_{NO}$, and the maximum image angle 2ω.

TABLE 3

| # | R | D | $N_d$ | $v_d$ |
|---|---|---|---|---|
| 0 (stop) | ∞ | 0.05 | | |
| 1* | −6.2341 | 1.10 | 1.50614 | 56.4 |
| 2* | −1.4222 | 0.25 | | |
| 3* | 10.3042 | 1.10 | 1.50614 | 56.4 |
| 4* | ∞ | 1.59 | | |
| 5 | ∞ | 0.80 | 1.51680 | 64.2 |
| 6 | ∞ | | | |
| f = 2.89 mm | | $F_{NO}$ = 4.0 | 2ω = 63.6° | |

The surfaces with a * to the right of the surface number in Table 3 are aspheric lens surfaces, and the aspheric surface shape is expressed by Equation (A) above.

Tables 4 below lists the values of the constants K, $A_4$, $A_6$, $A_8$, and $A_{10}$ used in Equation (A) above for the aspheric lens surfaces #1 and #2 of Table 3, and Table 5 below lists the values of the constants K and $A_3$–$A_{10}$ used in Equation (A) above for each of the aspheric lens surfaces #3 and #4 of Table 3. Aspheric coefficients that are not present in Tables 4 and 5 are zero. An "E" in the data indicates that the number following the "E" is the exponent to the base 10. For example, "1.0E−2" represents the number $1.0 \times 10^{-2}$.

TABLE 4

| # | K | $A_4$ | $A_6$ | $A_8$ | $A_{10}$ |
|---|---|---|---|---|---|
| 1 | −300.0 | −1.4137E-1 | 1.1724E-1 | 6.8958E-2 | 1.7474E-2 |
| 2 | 2.5855 | 4.1107E-1 | −4.9092E-1 | 3.6650E-1 | 1.9335E-1 |

TABLE 5

| Aspheric Factor | #3 | #4 |
|---|---|---|
| K | −27.6694 | 300.0 |
| $A_3$ | 9.9562E-3 | −2.3320E-2 |
| $A_4$ | 5.7773E-1 | 2.1545E-1 |
| $A_5$ | −5.5167E-1 | 6.5725E-3 |
| $A_6$ | 5.0935E-2 | −1.5041E-1 |
| $A_7$ | 8.4760E-2 | 1.1021E-1 |
| $A_8$ | 1.6604E-2 | 4.9791E-2 |
| $A_9$ | 1.8845E-2 | −4.7642E-2 |
| $A_{10}$ | −2.9601E-2 | −9.7171E-3 |

Embodiment 2 satisfies Condition (1) with the value of f1/f2 being equal to 1.62. Embodiment 2 also satisfies Condition (2) with the value of $C_{L2}/D_{L2}$ being equal to 0.99. FIG. 2 illustrates the distance $C_{L2}$, and the distance $D_{L2}$ is the distance illustrated in FIG. 2 as $D_3$.

Figure 4A:
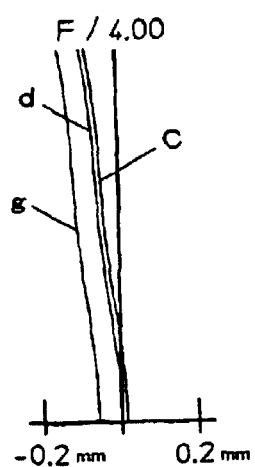
FIGS. 4A–4C show the spherical aberration, astigmatism, and distortion, respectively, according to Embodiment 2.
Figure 4B:
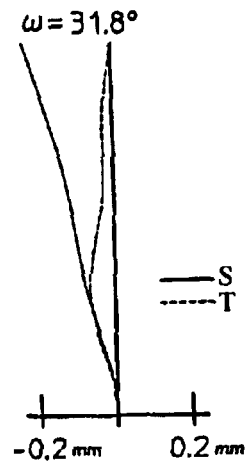
Figure 4C:
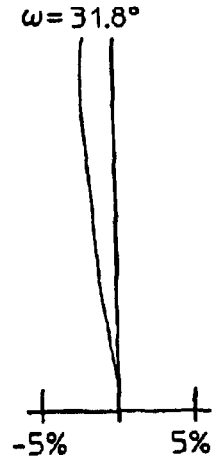

FIGS. 4A–4C show the spherical aberration, astigmatism, and distortion, respectively, of the imaging lens according to Embodiment 2. In FIG. 4A, the spherical aberration is shown for the d-line (λ=587.6 nm), the g-line (λ=435.8 mn), and the C-line (λ=656.3 nm). As shown in FIG. 4A, the f-number is 4.00. In FIG. 4B, the astigmatism is shown at the d-line (λ=587.6 nm) for both the sagittal image surface S and the tangential image surface T. In FIG. 4C, the distortion is shown at the d-line (λ=587.6 nm). The half-image angle ω for FIGS. 4B and 4C is 31.8°.

As is clear from the lens data and aberration curves discussed above, in Embodiment 2 the various aberrations are favorably corrected.

The invention being thus described, it will be obvious that the same may be varied in many ways. For instance, values such as the radius of curvature R of each of the lens elements and components, the surface spacing D, the refractive index $N_d$, as well as the Abbe number $v_d$, are not limited to the examples indicated in each of the aforementioned embodiments, as other values can be adopted. Additionally, the shape of the aspheric lens surfaces may be varied. Also, lens elements that act as lens components may variously be modified as lens components that include more than one lens element. Thus, the descriptions of imaging lenses of the present invention above, including the descriptions of Conditions (1) and (2) above, may be similarly expressed in terms of lens components or in terms of both lens components and lens elements, as appropriate. Furthermore, the invention may be used with digital cameras, personal computers, and a variety of portable electronic devices. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An imaging lens of fixed focal length formed of only two lens components, in order from the object side, as follows:

an aperture diaphragm;

a first lens component having positive refractive power, having a concave lens surface on the object side, and having at least one aspheric lens surface; and a second lens component having positive refractive power and having at least one aspheric lens surface;

wherein the following conditions are satisfied:

$$f1/f2 < 3.0$$

$$C_{L2}/D_{L2} > 0.8$$

where f1 is the focal length of said first lens component, f2 is the focal length of said second lens component, $C_{L2}$ is the thickness of said second lens component, measured parallel to the optical axis, at a distance from the optical axis determined by the smaller maximum optically effective diameter in said imaging lens of the two lens surfaces of said second lens component, and $D_{L2}$ is the thickness of said second lens component at the optical axis of the imaging lens.

2. The imaging lens of claim 1, wherein:

said first lens component includes a first lens element; and said second lens component includes a second lens element.

3. The imaging lens of claim 1, wherein:

said first lens component consists of a first lens element; and said second lens component consists of a second lens element.

4. The imaging lens of claim 1, wherein:

said first lens component has a meniscus shape;

said second lens component has a meniscus shape with its convex lens surface on the object side; and the concave lens surface of said second lens component is formed so that its negative refractive power increases as the distance from the optical axis of the imaging lens increases.

5. The imaging lens of claim 2, wherein:

said first lens component has a meniscus shape;

said second lens component has a meniscus shape with its convex lens surface on the object side; and the concave lens surface of said second lens component is formed so that its negative refractive power increases as the distance from the optical axis of the imaging lens increases.

6. The imaging lens of claim 2, wherein:

said first lens element has a meniscus shape;

said second lens element has a meniscus shape with its convex lens surface on the object side; and the concave lens surface of said second lens element is formed so that its negative refractive power increases as the distance from the optical axis of the imaging lens increases.

7. The imaging lens of claim 3, wherein:

said first lens element has a meniscus shape;

said second lens element has a meniscus shape with its convex lens surface on the object side; and the concave lens surface of said second lens element is formed so that its negative refractive power increases as the distance from the optical axis of the imaging lens increases.

* * * * *